United States Patent [19]

Ewbank et al.

[11] Patent Number: 4,953,954
[45] Date of Patent: Sep. 4, 1990

[54] PHASE-CONJUGATE COMMUNICATION USING MUTUALLY INCOHERENT LASER BEAMS

[75] Inventors: Mark D. Ewbank, Newbury Park; Tallis Y. Chang, Woodland Hills; Jack L. Feinberg, Manhattan Beach, all of Calif.

[73] Assignee: Rockwell International Corporation, Thousand Oaks, Calif.

[21] Appl. No.: 308,580

[22] Filed: Feb. 10, 1989

[51] Int. Cl.$^5$ .......................... G07B 5/23; H04B 1/00; G02F 1/60
[52] U.S. Cl. .................................. 350/354; 350/3.61; 350/3.6; 370/1; 370/4; 455/601; 455/609; 455/617
[58] Field of Search .................... 350/3.6, 3.61, 96.13, 350/354; 370/1, 4; 455/601, 609, 613, 617

[56] References Cited

U.S. PATENT DOCUMENTS

| | | | |
|---|---|---|---|
| 4,573,767 | 3/1986 | Jewell | 350/354 |
| 4,720,176 | 1/1988 | Klein et al. | 350/353 |
| 4,739,496 | 4/1988 | Marom et al. | 300/3.6 |

Primary Examiner—Eugene R. Laroche
Assistant Examiner—Michael B. Shingleton
Attorney, Agent, or Firm—John J. Deinken

[57] ABSTRACT

A phase-conjugate optical communication system includes a first source of coherent radiation for producing a first beam having a nominal wavelength λ and a first modulator for temporally modulating the first beam. A second source of coherent radiation, mutually incoherent with the first source, produces a second beam having the nominal wavelength λ, while a second modulator temporally modulates the second beam. A mutually pumped phase conjugator is positioned such that the first and second beams fan in the conjugator and produce a set of shared fanning holograms, the holograms causing a third beam, which is the phase conjugate of the first beam and on which is imposed the temporal modulation of the second beam, to be diffracted in a direction opposite to the first beam and causing a fourth beam, which is the phase conjugate of the second beam and on which is imposed the temporal modulation of the first beam, to be diffracted in a direction opposite to the second beam.

30 Claims, 7 Drawing Sheets

PHASE-CONJUGATE COMMUNICATION USING MUTUALLY INCOHERENT LASER BEAMS

BACKGROUND OF THE INVENTION

This invention involves the field of nonlinear optics and is concerned with optical phase-conjugate communication systems utilizing mutually incoherent laser beams.

On a fundamental level, the phenomena of nonlinear optics arise out of the interaction of light and matter. This interaction is nonlinear for those materials in which incident light can change the material's index of refraction, thereby affecting the frequency, intensity, and/or phase of the light as it propagates through the material. By providing a means to manipulate these properties of a coherent beam of light, nonlinear optics has made possible new optical applications in such fields as optical information processing, optical computing, laser beam control, and optical sensors.

The branch of nonlinear optics known as phase-conjugate optics deals with the generation, propagation, and application of phase-conjugated beams of light. If a light beam is considered as the motion of a family of wavefronts in space, the phase-conjugate of that light wave has exactly the same set of wavefronts as the initial wave, but the phase-conjugate wave moves in the opposite direction. Consequently, a phase-conjugate beam can be considered a time-reversed replica of an incident beam, capable of retracing the path of the incident beam. A device which can generate such a beam is known as a phase-conjugate mirror.

One important way in which phase-conjugated light can be produced is by employing the photorefractive effect, a nonlinear optical phenomenon which occurs in photorefractive crystals, such as barium titanate ($BaTiO_3$) and strontium barium niobate ($Sr_{1-x}Ba_xNb_2O_6$). When a photorefractive crystal is illuminated with two mutually coherent laser beams, interference between the two beams causes an optical fringe pattern to be formed within the crystal. The fringe pattern induces a separation of electrical charges within the material. This charge separation creates an electric field that, in turn, induces a local variation in the index of refraction of the crystal via the Pockels effect, resulting in a volume index grating that allows the exchange of energy between the beams. Phase-conjugate light is produced by a readout beam of the same frequency, counterpropagating to one mutually coherent write beam which diffracts off the volume hologram (index grating) in a direction counterpropagating to the other write beam.

A distinctive feature of the exchange of energy by means of photorefractive two-beam coupling is the lack of any phase crosstalk in the process, i.e., one beam can be amplified at the expense of the other without the aberrations and frequency differences of the donor beam being transferred to the acceptor beam. The discovery of this phenomenon has led to a variety of new applications, including beam processing techniques, such as image amplification, laser beam cleanup, and beam combining, as well as device structures such as ring oscillators, laser radars, and sensor protection devices. In photorefractive crystals with a large two-beam coupling gain, a stimulated effect known as beam fanning can occur. In this effect, scattered light generated from scattering centers (defects or impurities) in the crystal can be amplified via two-beam coupling. The end result is that an initially well-defined incident laser beam spreads out spatially upon exiting the crystal. Beam fanning is a crucial part of many photorefractive device applications including those described here.

Mutual coherence of the two beams writing the photorefractive hologram is required for both photorefractive two-beam coupling and photorefractive phase conjugation. This mutual coherence requirement, however, severely limits the practicality of the photorefractive effect, particularly for phase conjugation over large distances. In U.S. Pat. Application No. 228,437, now U.S. Pat. No. 4,911,537 ("Bird-Wing Phase Conjugator using Mutually Incoherent Laser Beams", filed Aug. 5, 1988, Mark D. Ewbank, applicant) a new phase conjugation technique is disclosed which provides for efficient phase conjugation using mutually incoherent beams. This new technique would be particularly useful in communication systems which use mutually incoherent beams for laser sources separated by large distances.

SUMMARY OF THE INVENTION

This invention allows mutually incoherent beams of light to be phase conjugated at a significantly higher speed than was possible in the prior art.

A phase-conjugate optical communication system constructed according to the invention includes a first source of coherent radiation for producing a first beam having a nominal wavelength $\lambda$ and a first modulator for temporally modulating the first beam. A second source of coherent radiation, mutually incoherent with the first source, produces a second beam having the nominal wavelength $\lambda$, while a second modulator temporally modulates the second beam. A mutually pumped phase conjugator is positioned such that the first and second beams fan in the conjugator and produce a set of shared fanning holograms, the holograms causing a third beam, which is the phase conjugate of the first beam and on which is imposed the temporal modulation of the second beam, to be diffracted in a direction opposite to the first beam and causing a fourth beam, which is the phase conjugate of the second beam and on which is imposed the temporal modulation of the first beam, to be diffracted in a direction opposite to the second beam.

A phase-conjugate optical interconnect is similar, but employs a plurality of second sources of coherent radiation and a plurality of second modulators. When the first and a selected one of the second beams is incident on the conjugator, the first and the selected second beam fan in the conjugator and cause a third beam to be diffracted in a direction opposite to the first beam and cause a fourth beam to be diffracted in a direction opposite to the selected second beam, thereby providing a connection between the first beam and the selected second beam. The optical interconnnect may also be achieved between a first plurality of sources of coherent radiation for producing a plurality of first beams, each having a nominal wavelength $\lambda$ and a second plurality of sources of coherent radiation, each mutually incoherent with each first source, for producing a plurality of second beams each having the nominal wavelength $\lambda$.

A phase-conjugate optical multiplexer/demultiplexer includes a first source for producing a first beam having a component with a first wavelength $\lambda_1$ and a component with a second wavelength $\lambda_2$, a second source for producing a second beam having the nominal wavelength $\lambda_1$, and a third source for producing a third beam having the nominal wavelength $\lambda_2$. The conjugator is positioned such that when the first, second and third beams are incident on the conjugator, the $\lambda_1$ component of the first beam and the second beam fan in the conjugator and produce a first set of shared fanning holograms and the $\lambda_2$ component of the first beam and the third beam fan in the conjugator and produce a second set of shared fanning holograms, resulting in the multiplexing of the second and third beams and demultiplexing of the $\lambda_1$ and $\lambda_2$ components of the first beam.

A secure phase-conjugate optical communication system includes the first and second sources and first and second modulators and two mutually pumped phase conjugators. The first conjugator is positioned such that the first beam and light scattered from the second beam by the second conjugator fan in the first conjugator and produce a first set of shared fanning holograms, the first holograms causing a third beam to be diffracted in a direction opposite to the first beam and causing a first linking beam to be diffracted toward the second conjugator, while the second conjugator is positioned such that the second beam and light scattered from the first beam by the first conjugator fan in the second conjugator and produce a second set of shared fanning holograms, the second holograms causing a fourth beam to be diffracted in a direction opposite to the second beam and causing a second linking beam to be diffracted toward the first conjugator.

In more particular embodiments, the conjugator is a photorefractive crystal capable of generating beam fanning in a preferred direction, the crystal having a first face whose surface normal is perpendicular to the preferred fanning direction and a second face parallel to the first face. The crystal is positioned so that the first beam is incident on the first face of the crystal and makes an acute angle with the preferred fanning direction of the crystal and such that the second beam is incident on the second face of the crystal and makes an acute angle with the preferred fanning direction of the crystal.

DESCRIPTION OF THE INVENTION

Aberration correction and self-tracking are well known properties of optical phase conjugation (see, e.g., Yariv, Phase Conjugate Optics and Real-Time Holography, IEEE Journal of Quantum Electronics, Volume 14, Page 650 (1978). Consider, for example, a degenerate four-wave mixing geometry where two counterpropagating pump beams and a probe beam all intersect in a nonlinear optical medium. If the incident probe beam passes through a linear optical distortion or an aberrator, then, in principle, the phase-conjugate retroreflection (after retraversing the aberrator) will be free of aberrations. In practice, this aberration correction takes place with high fidelity only when the counterpropagating pumping beams are a perfect phase-conjugate pair and when the probe and pump writing beams are coherent with each other. Both of these criteria are met by a self-pumping phase conjugator (see, e.g., Feinberg, Self-Pumped, Continuous-Wave Phase Conjugator using Internal Reflection, Optics Letters, Volume 7, Page 486 (1982), where the pumping beams are self-generated via feedback of photorefractively fanned light).

Full optical communication between two remote sites, however, generally requires two separate laser sources, i.e., each site must be equipped with both a transmitter and a receiver. The Feinberg self-pumped conjugator could provide a phase-conjugate link between two remote sites with separate lasers, but only if the lasers were phase-locked and mutually coherent. Other variations incorporating such self-pumped conjugators, including some which do not require mutual coherence, have also been investigated (see Pepper, Hybrid Phase Conjugator/Modulators using Self-Pumped 0°-Cut and 45°-Cut BaTiO$_3$ Crystals, Applied Physics Letters, Volume 49, Page 1001 (1986)), but also exhibit drawbacks.

It is an outstanding feature of this invention to provide an optical communication system which employs phase conjugation using mutually incoherent beams. This allows the benefits of the phase conjugation process, such as aberration correction and self-tracking, to be obtained in systems where separate beams cannot be made coherent with one another. In the preferred embodiments of this invention, the phase conjugation process involves two mutually incoherent beams of laser light directed toward opposite faces of a photorefractive crystal, so that both beams can fan toward a common adjacent face of the crystal. These two sets of fanning beams are positioned to overlap and internally reflect off the adjacent face, producing a channel of light within the crystal which resembles the outline of a bird's wings. This "bird-wing" channel, as explained in more detail in U.S. Pat. Application No. 228,437, filed Aug. 5, 1988, couples the two incident beams, producing phase-conjugate reflections that counterpropagate relative to the two incident beams.

Figure 1:
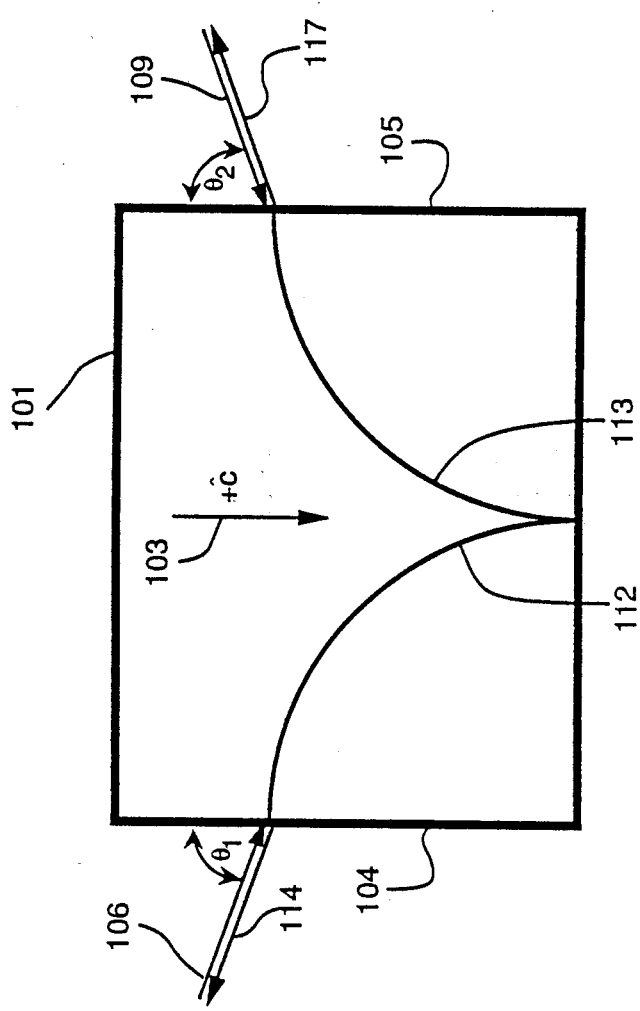
FIG. 1 is a cross-sectional schematic illustrating one example of the bird-wing phase-conjugation process.

FIG. 1 is a cross-sectional schematic illustrating the manner in which the bird-wing phase-conjugation process operates. A photorefractive crystal 101 has a c-axis direction indicated by the arrow 103, this direction being defined as the preferred fanning direction of light in the crystal. The crystal 101 also has a first a-face 104 whose surface normal is perpendicular to the c-axis, and a second a-face 105 parallel to the first a-face. A first beam of incoming coherent (laser) light 106, which has a wavelength $\lambda$, is incident on the first a-face of the crystal and makes an acute angle $\theta_1$ with respect to the +c-axis of the crystal. A second beam of incoming laser light 109 is mutually incoherent with the first beam, although the second beam has the same nominal wavelength λ as the first beam. The second beam 109 impinges on the second a-face 105 of the crystal, making an acute angle $\theta_2$ with respect to the +c-axis of the crystal.

With the beam and crystal geometry shown in FIG. 1, each of the incident beams 106 and 109 can potentially form its own self-pumped phase conjugator (see Feinberg, supra), either separately or simultaneously. If, however, the two incident beams are positioned to minimize this self-pumping process, or the intensities of the beams are sufficiently balanced that each beam erases the self-pumped gratings of the other beam, then an alternate set of photorefractive gratings will be formed. These holograms produce the "bird-wing" beam paths 112 and 113 in the crystal. When this situation occurs, a phase-conjugate reflection 114 of the first beam 106 is produced in a direction opposite to that of the first beam by the holographic diffraction of the second beam 109, while a phase-conjugate reflection 117 of the second beam is produced in a direction opposite to that of the second beam by the holographic diffraction of the first beam. In other words, the phase-conjugate reflections of the beams 106 and 109 are derived solely from a direct readout of the volume holograms by beams 109 and 106, respectively.

In this bird-wing phase conjugation process, the two mutually incoherent incident beams 106 and 109 each experience photorefractive beam fanning toward a preferred fanning direction (which, in the case of $BaTiO_3$, is the +c-axis) within the crystal. The fanned light from one beam can Bragg diffract off the fanning gratings formed by the other beam. The fanning holograms generated from one incident beam will reinforce the fanning holograms produced by the second incident beam only if the light scattered from the first incident beam's hologram is the phase-conjugate of the second beam (see Ewbank, et al., Fidelity of Passive Phase Conjugators, Proceedings of the SPIE, Volume 613, Page 11 (1986)). In other words, all overlapping photorefractive fanning holograms produced independently by the two incident beams will be largely erased unless they are written by mutually phase-conjugated beams. There is no mutual coherence requirement for the two incident beams. Indeed, mutual incoherence between these beams is preferred since in that situation there will be no interference intensity patterns written between the two incident beams to generate a competing photorefractive grating. Each of the two incident beams, however, must be able to Bragg diffract off the other beam's hologram, which implies that the incident beams must have the same nominal wavelength. As a consequence of this process, the frequency content of the beam 106 is transferred to the beam 117 and the frequency content of the beam 109 is similarly transferred to the beam 114, but the wavefronts are phase conjugated.

Although the bird-wing technique described above is the preferred phase conjugation process for use in this invention and is depicted in the embodiments described herein, those skilled in the art will appreciate that other mutually pumped phase conjugators can be used as well. Any such mutually pumped phase conjugator will work provided that it involves two mutually incoherent beams of light producing a pair of phase-conjugate beams via a cross-readout of self-induced holographic gratings. These gratings can be generated photorefractively or by other nonlinear optical means, such as the Kerr effect (see Yeh, et al., Model for Mutually Pumped Phase Conjugation, Journal of the Optical Society of America B, Volume 5, Page 1743 (1988)).

Figure 2:
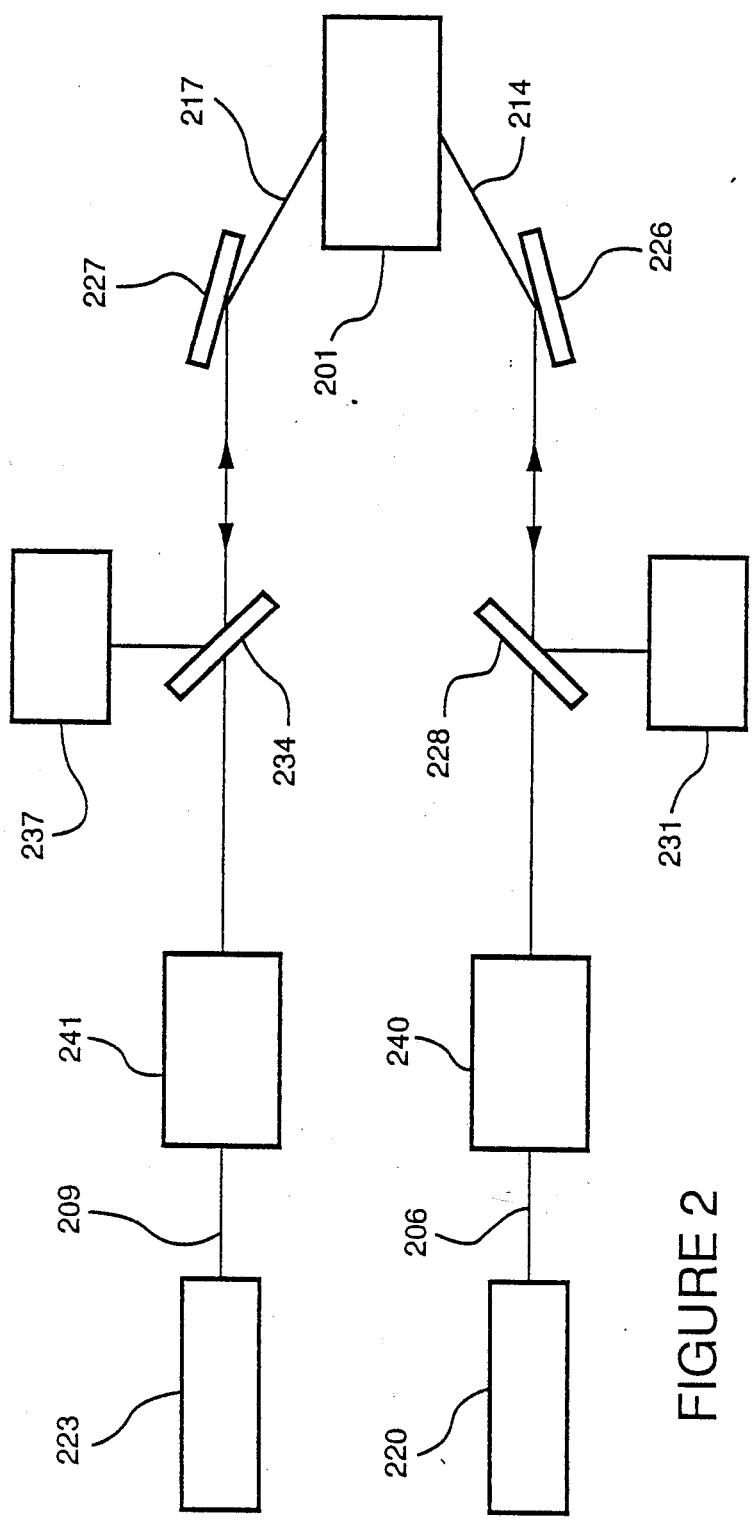
FIG. 2 is a schematic diagram of a phase-conjugate communication system based on the bird-wing conjugator depicted in FIG. 1.

FIG. 2 is a schematic diagram of a phase-conjugate communication system which utilizes mutually pumped phase conjugation provided by the bird-wing phase conjugation scheme depicted in FIG. 1. A first laser 220 generates a first coherent beam 206, while a second laser 223 generates a second coherent beam 209. The first and second beams have the same nominal wavelength, but are mutually incoherent with respect to one another. A first mirror 226 directs the first beam 206 toward a photorefractive crystal 201, while a second mirror 227 similarly directs the second beam 209 toward the crystal 201. The photorefractive crystal 201, which is capable of generating beam fanning in a preferred direction, has a first face whose surface normal is perpendicular to the preferred fanning direction and a second face parallel to the first face. The crystal is positioned so that the first beam impinges on the first face at an acute angle with the preferred fanning direction, while the second beam impinges on the second face, also at an acute angle with respect to the preferred fanning direction.

The shared photorefractive holograms which are produced by this arrangement cause a reflected beam 214, which is the phase conjugate of the first beam 206, to be diffracted from the crystal in a direction opposite to that of the first beam. Similarly, another reflected beam 217, which is the phase conjugate of the second beam 209, is diffracted from the crystal in a direction opposite to that of the second beam. A first beamsplitting isolator 228 diverts a portion of the reflected beam 214 to a first receiver 231, while a second beamsplitting isolator 234 directs a portion of the reflected beam 217 to a second receiver 237.

A first optical modulator 240 is used to temporally modulate the first beam 206 and a second optical modulator 241 is used to temporally modulate the second beam 209. While the beam 214 is the phase conjugate of the first beam 206, the mutually pumped phase conjugation process which occurs within the crystal 201 is such that the beam 214 carries the temporal modulation imposed by the second optical modulator 241 on the second beam 209. In a similar manner, the beam 217 carries the temporal modulation which was imposed on the first beam 206 by the first optical modulator 240. Therefore, temporal information impressed onto the first beam 206 by the first optical modulator 240 can transmitted to and received by the second receiver 237 at a remote location. Likewise, temporal information entered into this communication system by the second modulator 241 can be received by the first receiver 231. Thus the mutually pumped phase conjugation process of this invention simultaneously eliminates the need for mutually coherent lasers and overcomes the slower response times of other photorefractive conjugators, yet exhibits the advantages of a phase-conjugate communications system, such as self-tracking and aberration correction.

Experiments have demonstrated that the phase-conjugate communication system of this invention achieved a reasonably high phase-conjugate fidelity using a bird-wing phase conjugator, with the phase-conjugate signals being near-perfect retroreflections of the incident beams, even in the presence of severe linear optical distortions or aberrations. In addition, no spatial or temporal cross-talk (interference) was evident in the pair of phase-conjugate signals. A particular advantage for communications systems, which may involve a link between distant locations, is that the two mutually incoherent incident beams can originate from separate lasers as long as the two beams are the same nominal wavelength, i.e., as long as the incident beams are within the wavelength bandwidth for Bragg scattering, which is typically approximately 5 Angstroms for gratings that are on the order of 1,000 periods thick.

The frequency bandwidth for the communication system of FIG. 2 is not limited by the conjugator; rather, the optical modulators and the receiver detector electronics will determine the overall system frequency response. The reason that the photorefractive response time of the crystal in the bird-wing conjugator is not important is due to the cross-readout process which occurs within the conjugator. The speed of the photorefractive response will become important, however, if the aberrator is moving. Experiments have shown that the phase-conjugate reflection of one beam is produced by the holographic diffraction of the other beam in the direction of the first beam. Temporal modulations in the range of approximately 1 Hz to approximately 1 MHz have been successfully demonstrated using mechanical choppers and acousto-optic modulators in a system such as that shown in FIG. 2. The depth of modulation has been measured to be 100% even at approximately 1 MHz; in other words, when the second beam 209 is turned off or blocked, the intensity of the phase-conjugate reflection (the reflected beam 214) of the first beam 206 is reduced to zero.

Another advantage of the communication system of this invention is that the incident beams can be pulsed asynchronously, i.e., the incident beams do not have to be present simultaneously for the photorefractive gratings to form in the conjugator. This implies that the system can employ two pulsed laser systems even where the incident pulses are never synchronized at the photorefractive crystal and the photorefractive gratings will still form. The reason for this advantage can be attributed to the process of grating formation in a mutually pumped phase conjugator, using a photorefractive material with a long dark storage time (memory). Referring to FIG. 1, suppose the first beam 106 is a pulsed beam and a first pulse of light from this beam enters the crystal 101, generating a first set of photorefractive fanning gratings which diffract the first light pulse toward the +c face of the crystal. At a later time, a second light pulse arrives from beam 109 and enters the opposite a-face 105, generating a second set of fanning gratings which diffract the second pulse toward the +c face. The fanned light from the second pulse will tend to erase most of the photorefractive gratings previously written by the first pulse if the grating from the first pulse persists until the second pulse arrives. Similarly, the fanning produced by the next pulse arriving in beam 106 will tend to erase most of the photorefractive gratings written by the second pulse from the beam 109. The only fanning holograms which will not be erased as each new pulse arrives in the crystal are those responsible for generating the mutual phase-conjugate reflections 114 and 117. In fact, these mutual holograms get reinforced by each succeeding pulse. Thus the photorefractive grating erasure and reinforcement processes, which govern the formation of the bird-wing interaction, do not require that the incident light pulses from both directions be simultaneously present. As long as the dark storage time in the crystal is much longer than the time between the incident light pulses, the bird-wing interaction will dominate in the steady state situation, even with asynchronous incident pulses.

The phase-conjugate communication system of this invention is particularly advantageous when incorporated into a fiber-optical communications system which employs fiber lengths of many kilometers, since such distances exceed the coherence length of most laser sources. One application for the bird-wing phase conjugation technique in such a system is in an optically programmable interconnection scheme, such as that schematically illustrated in FIG. 3. Here, a first laser 320 produces a first beam 306 having a nominal wavelength $\lambda$. This beam is coupled into an optical fiber 342 by a first lens 345. Multiple lasers, such as the lasers 323, 324, and 325, produce a plurality of second beams, such as the beams 309, 310, and 311, each having the nominal wavelength $\lambda$ and being mutually incoherent with the beam 306. Each of the second beams is focussed into an optical fiber, such as the fibers 348, 349, and 350, by a lens, such as the lenses 351, 352, and 353. A photorefractive crystal 301 is positioned such that the first beam 306 exits the fiber 342 and impinges on the crystal. When one of the second beams 309–311 is turned on and allowed to impinge on the crystal, the first beam 306 and the selected second beam together produce a set of shared photorefractive fanning holograms in the crystal. These holograms allow the crystal to direct the light from the first laser 320 toward one, and only one, of the receivers 337, 338, and 339, which receive light diverted by the beamsplitters 334, 335, and 336, respectively. The interconnecting light channel automatically links the receiver corresponding to the one of the second beams 309–311 which is turned on. A particular advantage arises from the exact retroreflection properties of phase conjugation, which eliminate the need for any fiber-optic couplers between the ends of the fibers 342, 348–350 and the phase conjugator 301. Once the communication link is established, only the one receiver with which a connection has been made will receive the signal transmitted by the laser 320. Because of this directed information transfer, the communication link provided by this system can be considered secure.

Figure 3:
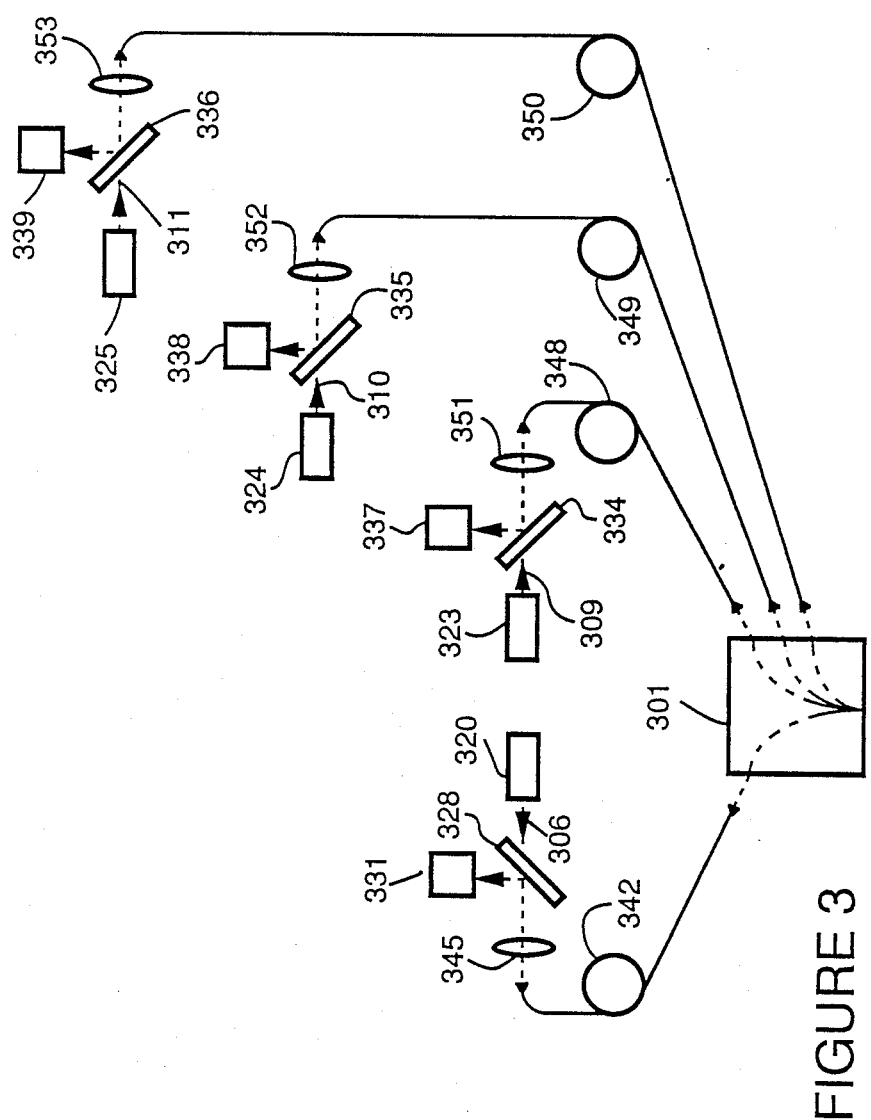
FIG. 3 is a schematic illustration of an optically programmable interconnection scheme utilizing the bird-wing phase conjugation technique.
Figure 4:
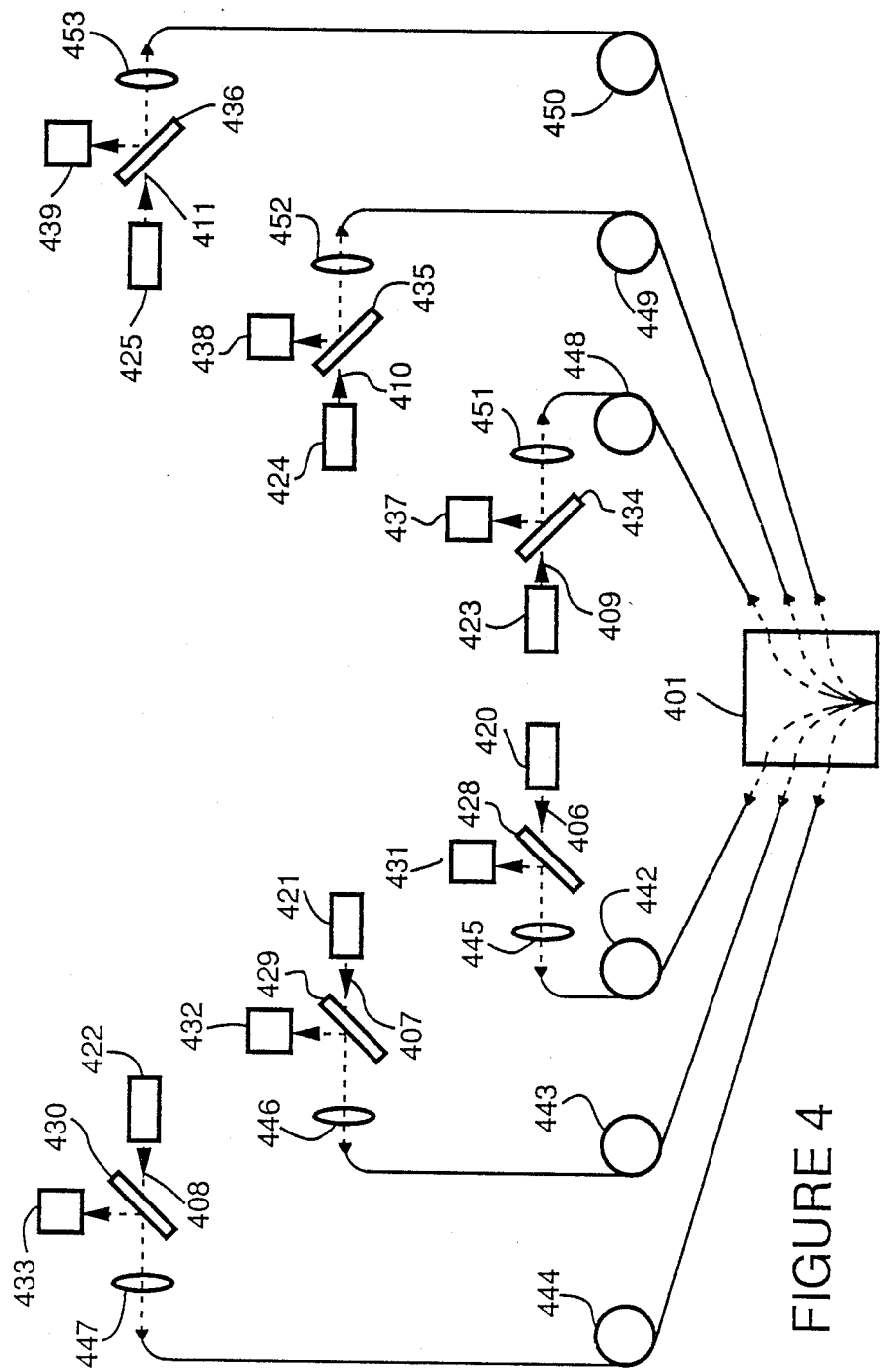
FIG. 4 is a schematic diagram of an optically programmable interconnect similar to that of FIG. 3, but expanded to establish a secure communications link between a first array of laser transmitter/receivers and a second array of laser transmitter/receivers.

The concept shown in FIG. 3 can also be expanded, as shown in FIG. 4, to establish a secure communications link between a first array of laser transmitter/receivers and a second array of laser transmitter/receivers. FIG. 4 depicts a secure phase-conjugate fiber communications system similar to that in FIG. 3, but including an array of beams on either side of the system. In FIG. 4, a first array of lasers 420, 421, and 422 produce first beams 406, 407, and 408, each having a nominal wavelength $\lambda$. A second array of lasers 423, 424, and 425, each mutually incoherent with the first array, produce an array of second beams 409, 410, and 411, each having the nominal wavelength $\lambda$. Each of the beams is coupled into an optical fiber 442, 443, 444, 448, 449, or 450 by a corresponding lens 445, 446, 447, 451, 452, or 453. One of the first array of beams is uniquely coupled to one of the second array of beams by means of a mutually pumped phase conjugation process within a photorefractive crystal 401. A beamsplitting isolator 428, 429, 430, 434, 435, or 436 at the receiving end of each beam in the arrays diverts incoming light to receiver 431, 432, 433, 437, 438, or 439, respectively. In this manner, a secure communication link can be established between any pair of laser transmitter/receivers, one from each array.

Figure 5:
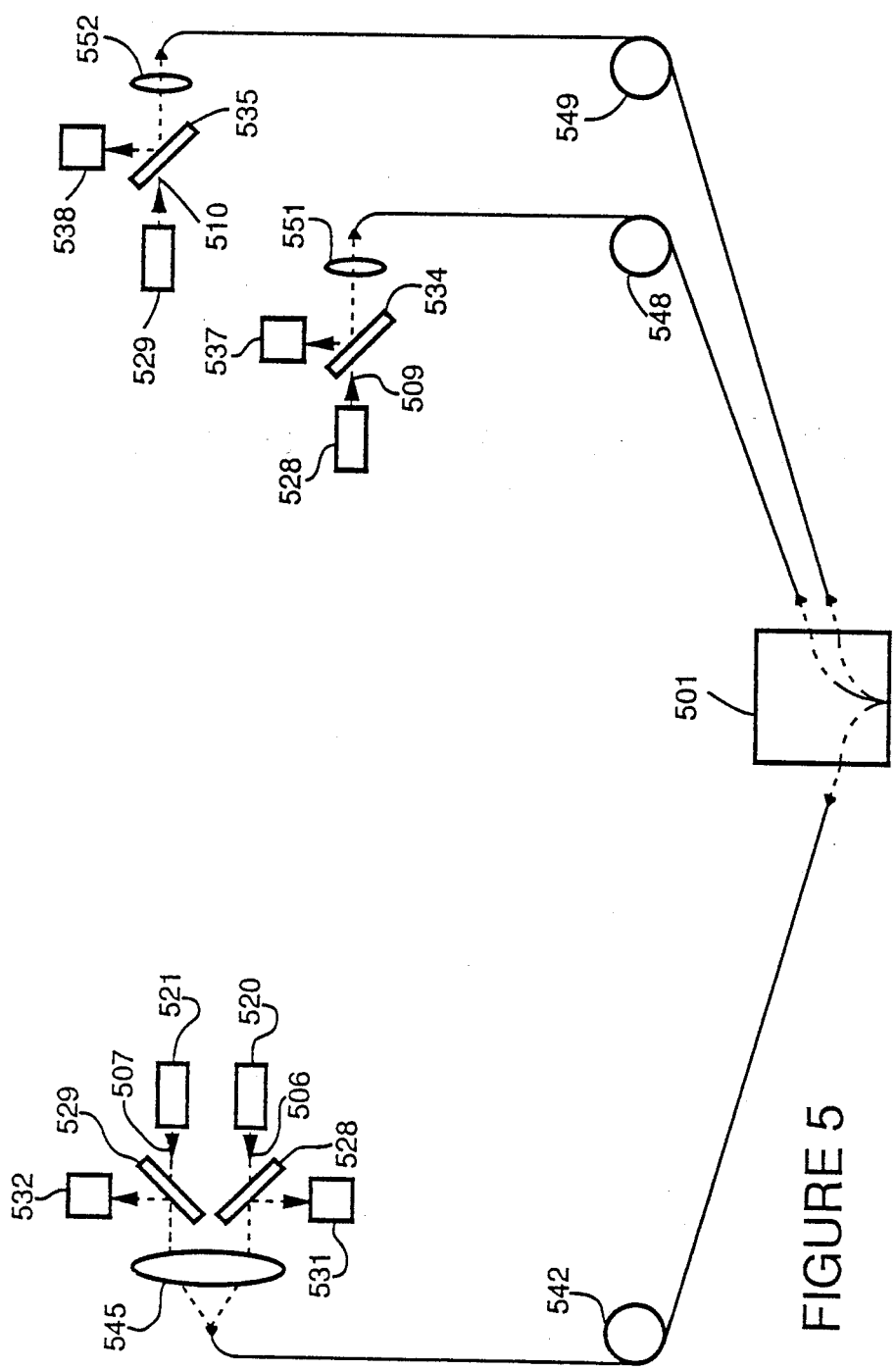
FIG. 5 is a schematic illustration of a phase-conjugate optical multiplexer/demultiplexer.

Another use for the phase-conjugate communication system of this invention is as an optical multiplexer/demultiplexer, one embodiment of which is illustrated in schematic form in FIG. 5. The phase-conjugate optical multiplexer/demultiplexer of FIG. 5 includes a first laser 520 which produces a beam 506 with a first wavelength $\lambda_1$ and a second laser 521 which produces a beam 507 with a second wavelength $\lambda_2$. These beams are coupled into a fiber 542 by a lens 545. A laser 528 produces a beam 509 which also has a nominal wavelength $\lambda_1$ and is mutually incoherent with the beam 506. A laser 529 produces a beam 510 having the nominal wavelength $\lambda_2$ and mutually incoherent with the beam 507. A photorefractive crystal 501 is positioned such that the beam emerging from the fiber 542 is incident on the crystal, while the beams 509 and 510 are incident on a second face of the crystal, thereby causing the $\lambda_1$ component of the combined beams 506 and 507 and the beam 509 to photorefractively fan toward a third face of the crystal and produce a first set of shared photorefractive fanning holograms, while the $\lambda_2$ component of the combined beams 506 and 507 and the beam 510 photorefractively fan toward the third face and produce a second set of shared photorefractive fanning holograms.

The first holograms cause a reflected beam 514, which is the phase conjugate of the $\lambda_1$ component of the combined beams 506 and 507 and on which is imposed the temporal modulation of the beam 509, to be diffracted in a direction opposite to the combined beams 506 and 507. The first holograms also cause a beam 517, which is the phase conjugate of the beam 509 and on which is imposed the temporal modulation of the $\lambda_1$ component of the combined beams 506 and 507, to be diffracted in a direction opposite to the beam 509. The second holograms cause a beam 515, which is the phase conjugate of the $\lambda_2$ component of the combined beams 506 and 507 and on which is imposed the temporal modulation of the beam 510, to be diffracted in a direction opposite to the combined beams 506 and 507. A beam 518, which is the phase conjugate of the beam 510 and on which is imposed the temporal modulation of the $\lambda_2$ component of the combined beams 506 and 507, is diffracted by the second holograms in a direction opposite to the beam 510, thereby providing multiplexing of the beams 509 and 510 and demultiplexing of the $\lambda_1$ and $\lambda_2$ components of the combined beams 506 and 507. This demultiplexing of optical signals without any cross-talk occurs due to the wavelength selectivity of the Bragg scattering process which is intrinsic to the mutually pumped phase conjugation process. This concept for spectral demultiplexing can be extended from two colors to many more, providing that the photorefractive crystal can simultaneously support all of the extra gratings (one set of gratings for each color). Another extension of the concept would involve two birdwing phase conjugators, one on either side of the single optical fiber link, with the first conjugator doing the multiplexing while the second conjugator accomplished demultiplexing.

Self-tracking is one of the features of optical phase conjugation and is a major advantage of using phase conjugation in an optical communication system. One drawback of this approach, however, is that in the phase conjugate optical communication systems known in the prior art, a conventional tracking and pointing system must be used to initially establish the phase-conjugate optical link. It is an outstanding feature of the present invention to provide a phase-conjugate optical system in which such a conventional tracking and pointing system is not required.

Figure 6:
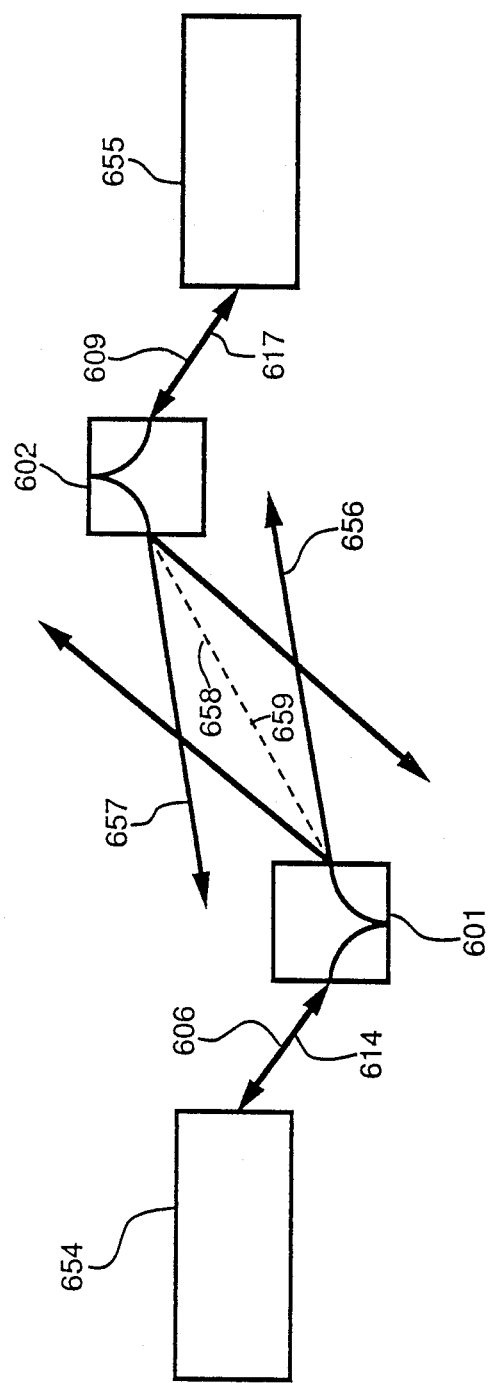
FIG. 6 illustrates in schematic form the broadcast mode of a phase-conjugate optical communication system which employs a broadcast-to-secure mode conversion to establish an optical communication link.

This concept involves a broadcast-to-secure mode conversion to establish an optical communication link. One embodiment of a phase-conjugate optical communication system which can be used in this scheme is shown in schematic form in FIG. 6. A first beam 606 having a nominal wavelength $\lambda$ is produced by a first transmitter/receiver unit 654. A second beam 609, mutually incoherent with the first but having the same nominal wavelength $\lambda$, is provided by a second transmitter/receiver unit 655. A first mutually pumped phase-conjugating crystal 601 is positioned such that the first beam is incident on the first crystal. A second mutually pumped phase-conjugating crystal 602 is positioned so that the second beam is incident on the second crystal.

When the first and second beams are initially directed onto the crystals, photorefractive scattering of the first beam causes a wide field-of-view broadcast (beam fanning) 656 of the first beam by the first crystal, while photorefractive scattering of the second beam causes a wide field-of-view broadcast 657 of the second beam by the second crystal. The angular field-of-view and approximate direction of these broadcast signals, as will be appreciated by those skilled in the art, can be controlled by simple optics, which are not illustrated in the figure. This directed scattering seeds the formation of photorefractive gratings in each of the crystals, resulting in the establishment of a first linking beam 658 having the nominal wavelength $\lambda$ and propagating from the first crystal to the second crystal and a second linking beam 659 having the nominal wavelength $\lambda$ and propagating from the second crystal to the first crystal in a direction opposite to the first linking beam.

As these photorefractive gratings form, the first beam 606 and the second linking beam 659 produce, by mutually pumped phase conjugation within the first crystal 601, a first set of shared photorefractive fanning holograms, the first holograms causing a beam 614, which is the phase conjugate of the first beam and on which is imposed the temporal modulation of the second linking beam, to be diffracted in a direction opposite to the first beam and causing the first linking beam 658, which is the phase conjugate of the second linking beam and on which is imposed the temporal modulation of the first beam, to be diffracted toward the second crystal.

In a similar manner, the second beam 609 and the first linking beam 658 produce a second set of shared photorefractive fanning holograms, causing a beam 617, which is the phase conjugate of the second beam and on which is imposed the temporal modulation of the first linking beam, to be diffracted in a direction opposite to the second beam and causing the second linking beam 659, which is the phase conjugate of the first linking beam and on which is imposed the temporal modulation of the second beam, to be diffracted toward the first crystal.

Figure 7:
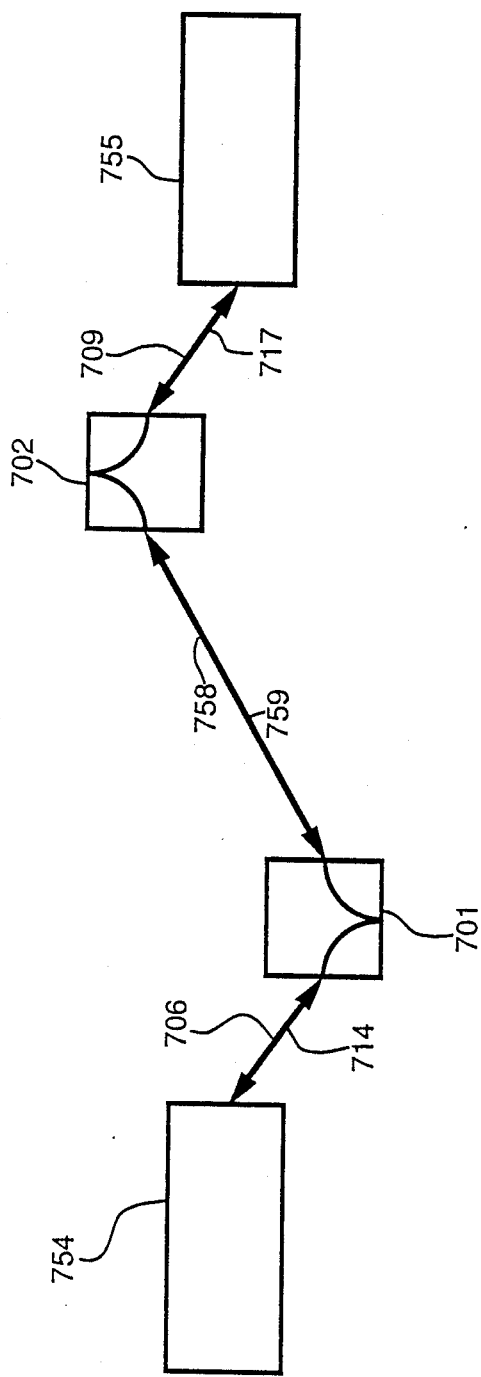
FIG. 7 depicts the communication system of FIG. 6 in the secure mode, after the optical communication link has been established.

The channeling of light within each of the crystals subsequently restricts or narrows the phase-conjugate communication between the two crystals to a secure link, as shown in FIG. 7, causing the initial wide-angle broadcasting to cease. Once the optical communication link is established, the self-tracking feature of phase conjugation becomes operational. Perturbations in the optical path between the two phase conjugators (due to, for example, atmospheric turbulence, relative motion of one crystal relative to the other, etc.) will automatically be compensated by the phase-conjugate nature of the optical link, provided that those perturbations occur more slowly than the response times of the phase-conjugators.

The preferred embodiments of this invention have been illustrated and described above. Modifications and additional embodiments, however, will undoubtedly be apparent to those skilled in the art. Optical wedge or prism elements, for example, could be added to the system to modify the angles of incidence of the incident beams within the photorefractive crystal. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

The teaching of the following documents, which are referred to herein, is incorporated by reference:

Ewbank, Bird-Wing Phase Conjugator using Mutually Incoherent Laser Beams, U.S. Pat. Application No. 228,437, filed Aug. 5, 1988;

Ewbank, et al., Fidelity of Passive Phase Conjugators, Proceedings of the SPIE, Volume 613, Page 11 (1986);

Feinberg, Self-Pumped, Continuous-Wave Phase Conjugator using Internal Reflection, Optics Letters, Volume 7, Page 486 (1982);

Pepper, Hybrid Phase Conjugator/Modulators using Self-Pumped 0°-Cut and 45°-Cut $BaTiO_3$ Crystals, Applied Physics Letters, Volume 49, Page 1001 (1986);

Yariv, Phase Conjugate Optics and Real-Time Holography, IEEE Journal of Quantum Electronics, Volume 14, Page 650 (1978);

Yeh, et al., Model for Mutually Pumped Phase Conjugation, Journal of the Optical Society of America B, Volume 5, Page 1743 (1988).

We claim:

1. A phase-conjugate optical communication system, comprising:
   a first source of coherent radiation for producing a first beam having a nominal wavelength $\lambda$;
   a first modulator for temporally modulating the first beam;
   a second source of coherent radiation, mutually incoherent with the first source, for producing a second beam having the nominal wavelength $\lambda$;
   a second modulator for temporally modulating the second beam; and
   a mutually pumped phase conjugator, the conjugator being positioned such that the first and second beams fan in the conjugator and produce a set of shared fanning holograms,
   the holograms causing a third beam, which is the phase conjugate of the first beam and on which is imposed the temporal modulation of the second beam, to be diffracted in a direction opposite to the first beam and causing a fourth beam, which is the phase conjugate of the second beam and on which is imposed the temporal modulation of the first beam, to be diffracted in a direction opposite to the second beam.

2. The system of claim 1, wherein the first source further comprises a first source of pulsed coherent radiation and wherein the second source further comprises a second source of pulsed coherent radiation, the second source being pulsed asynchronously with respect to the first source.

3. The system of claim 1, wherein the conjugator further comprises a photorefractive crystal capable of generating beam fanning in a preferred direction, the crystal having a first face whose surface normal is perpendicular to the preferred fanning direction and a second face parallel to the first face, the crystal being positioned such that the first beam is incident on the first face of the crystal and makes an acute angle with the preferred fanning direction of the crystal and such that the second beam is incident on the second face of the crystal and makes an acute angle with the preferred fanning direction of the crystal.

4. A phase-conjugate optical interconnect, comprising:
   a first source of coherent radiation for producing a first beam having a nominal wavelength $\lambda$;
   a first modulator for temporally modulating the first beam;
   a plurality of second sources of coherent radiation, each mutually incoherent with the first source, for producing a plurality of second beams each having the nominal wavelength $\lambda$;
   a plurality of second modulators, each second modulator being adapted to temporally modulate one of the second beams; and
   a mutually pumped phase conjugator, the conjugator being positioned such that when a selected one of the second beams is incident on the conjugator, the first and the selected second beams fan in the conjugator and produce a set of shared fanning holograms,
   the holograms causing a third beam, which is the phase conjugate of the first beam and on which is imposed the temporal modulation of the selected second beam, to be diffracted in a direction opposite to the first beam and causing a fourth beam, which is the phase conjugate of the selected second beam and on which is imposed the temporal modulation of the first beam, to be diffracted in a direction opposite to the selected second beam, thereby providing a connection between the first beam and the selected second beam.

5. The system of claim 4, wherein the first source further comprises a first source of pulsed coherent radiation and wherein the plurality of second sources further comprises a plurality of second sources of pulsed coherent radiation, each second source being pulsed asynchronously with respect to the first source.

6. The system of claim 4, wherein the conjugator further comprises a photorefractive crystal capable of generating beam fanning in a preferred direction, the crystal having a first face whose surface normal is perpendicular to the preferred fanning direction and a second face parallel to the first face, the crystal being positioned such that the first beam is incident on the first face of the crystal and makes an acute angle with the preferred fanning direction of the crystal and such that the selected second beam is incident on the second face of the crystal and makes an acute angle with the preferred fanning direction of the crystal.

7. A phase-conjugate optical interconnect, comprising:
   a first plurality of sources of coherent radiation for producing a plurality of first beams, each having a nominal wavelength $\lambda$;

a first plurality of modulators, each first modulator being adapted to temporally modulate one of the first beams;

a second plurality of sources of coherent radiation, each mutually incoherent with each first source, for producing a plurality of second beams each having the nominal wavelength $\lambda$;

a second plurality of modulators, each second modulator being adapted to temporally modulate one of the second beams; and a mutually pumped phase conjugator, the conjugator being positioned such that when a selected one of the first beams is incident on the conjugator and a selected one of the second beams is incident on the conjugator, the selected first and the selected second beams fan in the conjugator and produce a set of shared fanning holograms, the holograms causing a third beam, which is the phase conjugate of the selected first beam and on which is imposed the temporal modulation of the selected second beam, to be diffracted in a direction opposite to the selected first beam and causing a fourth beam, which is the phase conjugate of the selected second beam and on which is imposed the temporal modulation of the selected first beam, to be diffracted in a direction opposite to the selected second beam, thereby providing a connection between the selected first beam and the selected second beam.

8. The system of claim 7, wherein the first plurality of sources further comprises a first plurality of sources of pulsed coherent radiation and wherein the second plurality of sources further comprises a second plurality of sources of pulsed coherent radiation, the second plurality of sources being pulsed asynchronously with respect to the first plurality of sources.

9. The system of claim 7, wherein the conjugator further comprises a photorefractive crystal capable of generating beam fanning in a preferred direction, the crystal having a first face whose surface normal is perpendicular to the preferred fanning direction and a second face parallel to the first face, the crystal being positioned such that the selected first beam is incident on the first face of the crystal and makes an acute angle with the preferred fanning direction of the crystal and such that the selected second beam is incident on the second face of the crystal and makes an acute angle with the preferred fanning direction of the crystal.

10. A phase-conjugate optical multiplexer/demultiplexer, comprising:
a first source of coherent radiation for producing a first beam having a component with a first wavelength $\lambda_1$ and a component with a second wavelength $\lambda_2$;
a first modulator for temporally modulating the first beam;
a second source of coherent radiation mutually incoherent with the $\lambda_1$ component of the first source, for producing a second beam having the nominal wavelength $\lambda_1$;
a second modulator for temporally modulating the second beam;
a third source of coherent radiation mutually incoherent with the $\lambda_2$ component of the first source, for producing a third beam having the nominal wavelength $\lambda_2$;
a third modulator for temporally modulating the third beam; and a mutually pumped phase conjugator, the conjugator being positioned such that when the first, second and third beams are incident on the conjugator, the $\lambda_1$ component of the first beam and the second beam fan in the conjugator and produce a first set of shared fanning holograms and the $\lambda_2$ component of the first beam and the third beam fan in the conjugator and produce a second set of shared fanning holograms, the first holograms causing a fourth beam, which is the phase conjugate of the $\lambda_1$ component of the first beam and on which is imposed the temporal modulation of the second beam, to be diffracted in a direction opposite to the first beam and causing a fifth beam, which is the phase conjugate of the second beam and on which is imposed the temporal modulation of the $\lambda_1$ component of the first beam, to be diffracted in a direction opposite to the second beam, the second holograms causing a sixth beam, which is the phase conjugate of the $\lambda_2$ component of the first beam and on which is imposed the temporal modulation of the third beam, to be diffracted in a direction opposite to the first beam and causing a seventh beam, which is the phase conjugate of the third beam and on which is imposed the temporal modulation of the $\lambda_2$ component of the first beam, to be diffracted in a direction opposite to the third beam, thereby providing multiplexing of the second and third beams and demultiplexing of the $\lambda_1$ and $\lambda_2$ components of the first beam.

11. The system of claim 10, wherein the first source further comprises a first source of pulsed coherent radiation; the second source further comprises a second source of pulsed coherent radiation; and the third source further comprises a third source of pulsed coherent radiation, the second and third sources being pulsed asynchronously with respect to the first source.

12. The system of claim 10, wherein the conjugator further comprises a photorefractive crystal capable of generating beam fanning in a preferred direction, the crystal having a first face whose surface normal is perpendicular to the preferred fanning direction and a second face parallel to the first face, the crystal being positioned such that the first beam is incident on the first face of the crystal and makes an acute angle with the preferred fanning direction of the crystal and such that the second and third beams are incident on the second face of the crystal and make acute angles with the preferred fanning direction of the crystal.

13. A secure phase-conjugate optical communication system, comprising:
a first source of coherent radiation for producing a first beam having a nominal wavelength $\lambda$;
a first modulator for temporally modulating the first beam;
a second source of coherent radiation, mutually incoherent with the first source, for producing a second beam having the nominal wavelength $\lambda$;
a second modulator for temporally modulating the second beam;
a first mutually pumped phase conjugator;
a second mutually pumped phase conjugator;
the first conjugator being positioned such that the first beam and light scattered from the second beam by the second conjugator fan in the first conjugator and produce a first set of shared fanning holograms, the first holograms causing a third beam to be diffracted in a direction opposite to the first beam and causing a first linking beam to be diffracted toward the second conjugator, and the second conjugator being positioned such that the second beam and light scattered from the first beam by the first conjugator fan in the second conjugator and produce a second set of shared fanning holograms, the second holograms causing a fourth beam to be diffracted in a direction opposite to the second beam and causing a second linking beam to be diffracted toward the first conjugator.

14. The system of claim 13, wherein the first source further comprises a first source of pulsed coherent radiation and wherein the second source further comprises a second source of pulsed coherent radiation, the second source being pulsed asynchronously with respect to the first source.

15. The system of claim 13, wherein the first conjugator further comprises:

a first photorefractive crystal capable of generating beam fanning in a preferred direction and having a first face whose surface normal is perpendicular to the preferred fanning direction and a second face parallel to the first face;

and wherein the second conjugator further comprises:

a second photorefractive crystal capable of generating beam fanning in a preferred direction and having a first face whose surface normal is perpendicular to the preferred fanning direction and a second face parallel to the first face, the first crystal being positioned such that the first beam is incident on the first face of the crystal and makes an acute angle with the preferred fanning direction of the crystal and such that the second linking beam is incident on the second face of the crystal and makes an acute angle with the preferred fanning direction of the crystal, the second crystal being positioned such that the second beam is incident on the first face of the crystal and makes an acute angle with the preferred fanning direction of the crystal and such that the first linking beam is incident on the second face of the crystal and makes an acute angle with the preferred fanning direction of the crystal.

16. A method of optical communication, comprising the steps of:

producing a first coherent beam of radiation having a nominal wavelength $\lambda$;

temporally modulating the first beam;

producing a second coherent beam of radiation which is mutually incoherent with the first beam and has the nominal wavelength temporally modulating the second beam; and positioning a mutually pumped phase conjugator so that the first and second beams fan in the conjugator and produce a set of shared fanning holograms, the holograms causing a third beam, which is the phase conjugate of the first beam and on which is imposed the temporal modulation of the second beam, to be diffracted in a direction opposite to the first beam and causing a fourth beam, which is the phase conjugate of the second beam and on which is imposed the temporal modulation of the first beam, to be diffracted in a direction opposite to the second beam.

17. The method of claim 16, wherein the step of producing a first beam further comprises the step of producing a first pulsed coherent beam of radiation having a nominal wavelength $\lambda$ and wherein the step of producing a second beam further comprises the step of producing a second pulsed coherent beam of radiation having a nominal wavelength $\lambda$, the second beam being pulsed asynchronously with respect to the first beam.

18. The method of claim 16, wherein the step of positioning the conjugator further comprises the steps of:

providing a photorefractive crystal capable of generating beam fanning in a preferred direction, the crystal having a first face whose surface normal is perpendicular to the preferred fanning direction and a second face parallel to the first face; and positioning the crystal so that the first beam is incident on the first face of the crystal and makes an acute angle with the preferred fanning direction of the crystal and such that the second beam is incident on the second face of the crystal and makes an acute angle with the preferred fanning direction of the crystal.

19. A method of providing a phase-conjugate optical interconnection, comprising the steps of:

producing a first coherent beam of radiation having a nominal wavelength $\lambda$;

temporally modulating the first beam;

producing a plurality of second coherent beams of radiation, each mutually incoherent with the first beam and each having the nominal wavelength $\lambda$;

temporally modulating each second beam; and positioning a mutually pumped phase conjugator so that when the first beam and a selected one of the second beams is incident on the conjugator, the first beam and the selected second beam fan in the conjugator and produce a set of shared fanning holograms, the holograms causing a third beam, which is the phase conjugate of the first beam and on which is imposed the temporal modulation of the selected second beam, to be diffracted in a direction opposite to the first beam and causing a fourth beam, which is the phase conjugate of the selected second beam and on which is imposed the temporal modulation of the first beam, to be diffracted in a direction opposite to the selected second beam, thereby providing a connection between the first beam and the selected second beam.

20. The method of claim 19, wherein the step of producing a first beam further comprises the step of producing a first pulsed coherent beam of radiation having a nominal wavelength $\lambda$ and wherein the step of producing a plurality of second beams further comprises the step of producing a plurality of second pulsed coherent beams of radiation having a nominal wavelength $\lambda$, each second beam being pulsed asynchronously with respect to the first beam.

21. The method of claim 19, wherein the step of positioning a mutually pumped phase conjugator further comprises the steps of:

providing a photorefractive crystal capable of generating beam fanning in a preferred direction, the crystal having a first face whose surface normal is perpendicular to the preferred fanning direction and a second face parallel to the first face; and positioning the crystal so that the first beam is incident on the first face of the crystal and makes an acute angle with the preferred fanning direction of the crystal and such that the selected second beam is incident on the second face of the crystal and makes an acute angle with the preferred fanning direction of the crystal.

22. A method of providing a phase-conjugate optical interconnection, comprising the steps of:
producing a first plurality of coherent beams of radiation having a nominal wavelength $\lambda$;
temporally modulating each first beam;
producing a second plurality of coherent beams of radiation, each mutually incoherent with the first beams and each having the nominal wavelength $\lambda$;
temporally modulating each second beam; and
positioning a mutually pumped phase conjugator so that when a selected one of the first beams and a selected one of the second beams are incident on the conjugator, the selected first beam and the selected second beam fan in the conjugator and produce a set of shared fanning holograms,
the holograms causing a third beam, which is the phase conjugate of the selected first beam and on which is imposed the temporal modulation of the selected second beam, to be diffracted in a direction opposite to the selected first beam and causing a fourth beam, which is the phase conjugate of the selected second beam and on which is imposed the temporal modulation of the selected first beam, to be diffracted in a direction opposite to the selected second beam, thereby providing a connection between the selected first beam and the selected second beam.

23. The method of claim 22, wherein the step of producing a first plurality of beams further comprises the step of producing a first plurality of pulsed coherent beams of radiation having a nominal wavelength $\lambda$ and wherein the step of producing a second plurality of beams further comprises the step of producing a second plurality of pulsed coherent beams of radiation having the nominal wavelength $\lambda$, each second beam being pulsed asynchronously with respect to each first beam.

24. The method of claim 22, wherein the step of positioning a mutually pumped phase conjugator further comprises the steps of:
providing a photorefractive crystal capable of generating beam fanning in a preferred direction, the crystal having a first face whose surface normal is perpendicular to the preferred fanning direction and a second face parallel to the first face; and
positioning the crystal so that the selected first beam is incident on the first face of the crystal and makes an acute angle with the preferred fanning direction of the crystal and such that the selected second beam is incident on the second face of the crystal and makes an acute angle with the preferred fanning direction of the crystal.

25. A method of multiplexing and demultiplexing optical signals, comprising the steps of:
producing a first coherent beam of radiation having a component with a first wavelength $\lambda_1$ and a component with a second wavelength $\lambda_2$;
temporally modulating the first beam;
producing a second coherent beam of radiation which is mutually incoherent with the $\lambda_1$ component of the first beam and has the nominal wavelength $\lambda_1$;
temporally modulating the second beam;
producing a third coherent beam of radiation which is mutually incoherent with the $\lambda_2$ component of the first beam and has the nominal wavelength $\lambda_2$;
temporally modulating the third beam; and
positioning a mutually pumped phase conjugator so that the $\lambda_1$ component of the first beam and the second beam fan in the conjugator and produce a first set of shared fanning holograms, and so that the $\lambda_2$ component of the first beam and the third beam fan in the conjugator and produce a second set of shared fanning holograms,
the first holograms causing a fourth beam, which is the phase conjugate of the $\lambda_1$ component of the first beam and on which is imposed the temporal modulation of the second beam, to be diffracted in a direction opposite to the first beam and causing a fifth beam, which is the phase conjugate of the second beam and on which is imposed the temporal modulation of the $\lambda_1$ component of the first beam, to be diffracted in a direction opposite to the second beam,
the second holograms causing a sixth beam, which is the phase conjugate of the $\lambda_2$ component of the first beam and on which is imposed the temporal modulation of the third beam, to be diffracted in a direction opposite to the first beam and causing a seventh beam, which is the phase conjugate of the third beam and on which is imposed the temporal modulation of the $\lambda_2$ component of the first beam, to be diffracted in a direction opposite to the third beam, thereby providing multiplexing of the second and third beams and demultiplexing of the $\lambda_1$ and $\lambda_2$ components of the first beam.

26. The method of claim 25, wherein the step of producing a first beam further comprises the step of producing a first pulsed coherent beam of radiation having a component with a first wavelength $\lambda_1$ and a component with a second wavelength $\lambda_2$; the step of producing a second beam further comprises the step of producing a second pulsed coherent beam of radiation which is mutually incoherent with the $\lambda_1$ component of the first beam and has the nominal wavelength $\lambda_1$, the second beam being pulsed asynchronously with respect to the first beam; and the step of producing a third beam further comprises the step of producing a third pulsed coherent beam of radiation which is mutually incoherent with the $\lambda_2$ component of the first beam and has the nominal wavelength $\lambda_2$, the third beam being pulsed asynchronously with respect to the first beam.

27. The method of claim 25, wherein the step of positioning a mutually pumped phase conjugator further comprises the steps of:
providing a photorefractive crystal capable of generating beam fanning in a preferred direction, the crystal having a first face whose surface normal is perpendicular to the preferred fanning direction and a second face parallel to the first face; and
positioning the crystal so that the first beam is incident on the first face of the crystal and makes an acute angle with the preferred fanning direction of the crystal and such that the second and third beams are incident on the second face of the crystal and make an acute angle with the preferred fanning direction of the crystal.

28. A method of secure optical communication, comprising:
producing a first coherent beam of radiation having a nominal wavelength $\lambda$;
temporally modulating the first beam;
producing a second coherent beam of radiation which is mutually incoherent with the first beam and has the nominal wavelength temporally modulating the second beam;
providing a first mutually pumped phase conjugator;
providing a second mutually pumped phase conjugator;
positioning the first conjugator so that the first beam and light scattered from the second beam by the second conjugator fan in the first conjugator and produce a first set of shared fanning holograms; and
positioning the second conjugator so that the second beam and light scattered from the first beam by the first conjugator fan in the second conjugator and produce a second set of shared fanning holograms,
the first holograms causing a third beam to be diffracted in a direction opposite to the first beam and causing a first linking beam to be diffracted toward the conjugator,
the second holograms causing a fourth beam to be diffracted in a direction opposite to the second beam and causing a second linking beam to be diffracted toward the first conjugator.

29. The method of claim 28, wherein the step of producing a first beam further comprises the step of producing a first pulsed coherent beam of radiation having a nominal wavelength λ and wherein the step of producing a second beam further comprises the step of producing a second pulsed coherent beam of radiation having a nominal wavelength λ, the second beam being pulsed asynchronously with respect to the first beam.

30. The method of claim 28, wherein the steps of providing first and second conjugators further comprise:
providing a first photorefractive crystal capable of generating beam fanning in a preferred direction, the crystal having a first face whose surface normal is perpendicular to the preferred fanning direction and a second face parallel to the first face; and
providing a second photorefractive crystal capable of generating beam fanning in a preferred direction, the crystal having a first face whose surface normal is perpendicular to the preferred fanning direction and a second face parallel to the first face;
wherein the steps of positioning the first and second conjugators further comprise:
positioning the first crystal so that the first beam is incident on the first face of the crystal and makes an acute angle with the preferred fanning direction of the crystal and so that the second linking beam is incident on the second face of the crystal and makes an acute angle with the preferred fanning direction of the crystal.
positioning the second crystal so that the second beam is incident on the first face of the crystal and makes an acute angle with the preferred fanning direction of the crystal and so that the first linking beam is incident on the second face of the crystal and makes an acute angle with the preferred fanning direction of the crystal.

* * * * *